United States Patent [19]
Wylie

[11] Patent Number: 5,333,406
[45] Date of Patent: Aug. 2, 1994

[54] REPLACEABLE COVER FOR FISHING LURES

[76] Inventor: David Wylie, Rte. 1, Box 400, Devine, Tex. 78016

[21] Appl. No.: 71,072

[22] Filed: Jun. 2, 1993

[51] Int. Cl.⁵ .............................................. A01K 85/00
[52] U.S. Cl. .................... 43/42.09; 43/42.32
[58] Field of Search ................. 43/42.09, 42.32, 42.33, 43/42.34

[56] References Cited

U.S. PATENT DOCUMENTS

| | | | |
|---|---|---|---|
| 1,541,032 | 6/1925 | Dumouchel | 43/42.32 |
| 1,599,763 | 9/1926 | Head | 43/42.09 |
| 1,611,117 | 12/1926 | Kerns | 43/42.09 |
| 2,003,976 | 6/1935 | Raymond | 43/42.09 |
| 2,333,484 | 11/1943 | Miles | 43/42.33 |
| 2,578,411 | 12/1951 | Fisher | 43/42.09 |
| 2,579,377 | 12/1951 | Flynn | 43/42.09 |
| 2,796,693 | 6/1957 | Gunterman | 43/42.09 |
| 3,289,345 | 12/1966 | Reininger | 43/42.09 |
| 3,392,474 | 7/1968 | De Weese | 43/42.09 |
| 4,700,503 | 10/1987 | Pippert | 43/42.09 |

Primary Examiner—Kurt C. Rowan
Attorney, Agent, or Firm—Cox & Smith Incorporated

[57] ABSTRACT

A fishing lure comprising a lure blank enclosed in a cover of resilient cloth with the outer surface of said cover decorated to provide a desired color and appearance for the lure.

1 Claim, 1 Drawing Sheet

REPLACEABLE COVER FOR FISHING LURES

BACKGROUND OF THE INVENTION

1. FIELD OF THE INVENTION

This invention relates to fishing lures, and particularly to a replaceable decorated covering for fishing lures to permit a variety of fish attracting decorations to be applied to the lure through the application of the cover.

2. SUMMARY OF THE PRIOR ART

Most avid fishermen are seen carrying one or two good-sized tackle boxes. The majority of space in such tackle boxes is taken up by a variety of lures which the fisherman thinks might be effective in attracting the particular fish that he is seeking to catch on a particular day. An examination of such lures, however, reveals that many of the lures are of the same general configuration but differ only in the external color or decoration of the lures. There is a firm belief among fishermen that the color or appearance of the lure must be selected to conform to the ambient conditions on the particular fishing day. Thus, a different color lure may be more successfully employed on a cloudy day than on a sunny day, or in clear or muddy waters. Since the fisherman generally does not know in advance what conditions he will encounter on a particular planned fishing trip, he plays it safe by purchasing a variety of colors and decorations for essentially the same size and shape of a lure.

For example, one of the most popular lures is that shaped like a minnow. However, as is well known, minnows vary in color and appearance and some minnows are more attractive to a particular breed of game fish than others. Thus, the fisherman may end up purchasing 4 to 6 minnow lures of the same size, but differing only in color or decoration to more closely imitate a particular breed of minnows.

Obviously, if a single undecorated bait body could be employed and a variety of colors and decoration applied thereto, the fisherman's cost of purchasing lures would be substantially reduced, as would the size of his tackle box.

SUMMARY OF THE INVENTION

This invention solves the problem of carrying a multiplicity of substantially the same size and shape of lures through the utilization of decorated, flexible cloth covers which can be applied to an undecorated body bait to form a lure conforming to a desired color and decoration. The decorated cloth covering is conveniently applied to, or removed from, the undecorated body bait through the utilization of a resilient cloth.

A piece of such resilient cloth, which is previously colored and decorated on what will become the external surface of the lure, is cut and sewn so as to be mountable around and conform to the opposed side walls, and the top and bottom walls of a particular body bait. To retain the covering on the bait, the edges of the top wall, or the bottom wall, as the case may be, are secured together for only a limited length, thus leaving a slit between the remaining portions of the side edges. This slit is substantially smaller than the body of the undecorated body bait and permits the body bait to be inserted through the slit by the resilient expansion of the cloth material which then contracts to snugly engage the top, bottom and both side walls of the body bait. In this manner, an undecorated body bait may be quickly and economically converted to provide an appearance equal to that of any pre-decorated body bait and specifically providing a plurality of resilient covers respectively decorated to resemble the color and appearance of a plurality of differing live baits, such as minnows.

The invention is not limited to utilization for minnow-shaped baits, but could be used to convert an undecorated artificial mouse or frog body into a decorated bait resembling in color and appearance the various colors and surface appearance.

Further advantages of the invention will be readily apparent to those skilled in the art from the following detailed description, taken in conjunction with the annexed sheets of drawings, on which is shown a preferred modification of the invention.

DETAILED DESCRIPTION OF PREFERRED EMBODIMENT

Figure 1:
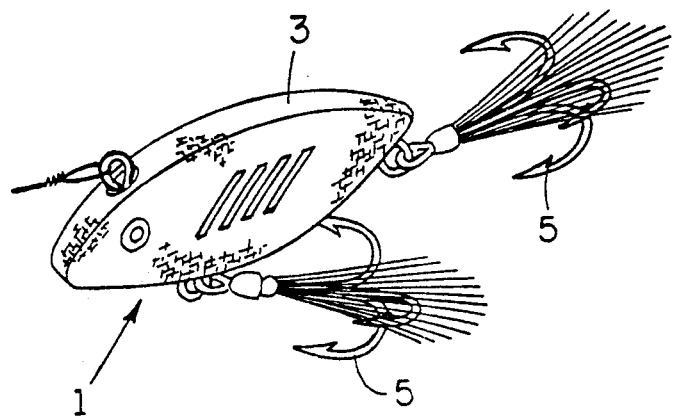
FIG. 1 is a perspective view of a fishing lure embodying a replaceable cover of this invention.
Figure 2:
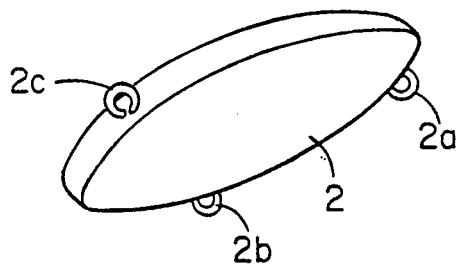
FIG. 2 is a perspective view of the body bait portion of a lure.

Referring to FIG. 1, there is shown a fishing bait lure 1 embodying this invention. Such lure comprises a solid, preferably undecorated, replica of the body of a live bait lure, such as a minnow 2 as shown in FIG. 2. Substantially, the entire external surface of the bait body 2 is covered by a flexible, predecorated cloth 3 which, when fitted over the bait body 2 gives the finished lure the appearance of a selected type of minnow.

Figure 3:
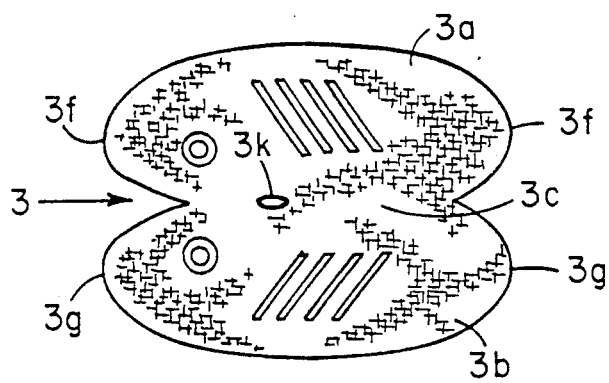
FIG. 3 is a plan view of the cut out form of the replaceable cover.
Figure 4:
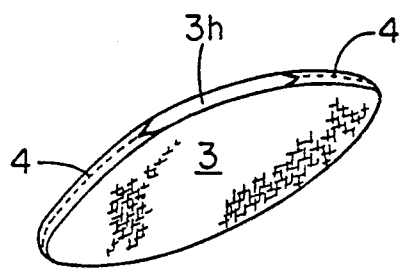
FIG. 4 is a perspective view of the cover when folded and sewn together prior to insertion of the body blank therein.

The cloth covering 3 is preferably formed from a flat sheet of flexible cloth or plastic, preferably the flexible plastic cloth sold under the Trademark Lycra Spandex. The edges of the piece of such cloth are cut so that when the two side panels 3a and 3b (FIG. 3) which are interconnected by a central panel portion 3c, are stretched around a body bait 2, as shown in FIG. 1, they will respectively conform to the top and bottom walls and opposed side walls of the bait body to produce a colored decorated bait resembling a selected type of minnow. A portion of the length of the edges 3c are 3d and 3e of the side panel portions 3a and 3b are sewn together by threads 4 (or heat sealed) as shown in FIG. 4, as are the rounded end portions 3f and 3g of the side panels 3a and 3b to produce a pocket or enclosure within which the body bait 2 may be inserted through the slit 3h provided by the unsewn portions 3h of the flexible cloth 3. Obviously, all peripheral portions of the flexible cloth 3 may, if desired, be sewn together (or heat sealed) and the slit 3h then cut in an unsewn portion of the covering 3. In either case, the slit 3h is of substantially smaller dimensions than the body bait 2, thus requiring resilient expansion of the slit 3h to permit the body bait 2 to be inserted in the sewed cover 3.

The overall dimensions of the sewed cover 3 are less than that of the body bait 2 so that when the body bait 2 is inserted therein, the cloth cover 3 is resiliently stretched into intimate contact therewith. This assures that the cover 3 will remain in position despite, hopefully, numerous attacks by game fish. The cover CLOTH 3 is predecorated to produce an accurate simulation in color and appearance of a particular minnow. Such decoration is, of course, applied to the side of the cover cloth 3 which becomes the external side after the flexible cloth is assembled around the body bait 2.

A hole (not shown) is provided in the tail portion of the cover 3 to surround a hook mounting 2a in the tail end of the body bait 2. Treble hooks 5 are secured to hook mounting 2a. A similar hole 3k may be provided in that portion of the resilient cover 3 which overlies the top wall of the body bait 2 for an eye hook 2c for securement to the fisherman's line. If desired, a second hook mounting 2b may be provided in the bottom wall of the body bait 2 to provide a mounting for a second set of treble hooks 5.

When a plurality of flexible cover 3 are provided with different decorations forms thereon corresponding to different types of minnows, it is obvious that a single body bait 2 may be employed to duplicate the performance of a plurality of predecorated body baits which now must be separately purchased and stored by the fisherman. The economic advantages of applicant's invention are therefore readily apparent.

Modifications of this invention, particularly the application of flexible coverings to other types of body baits, will be readily apparent to those skilled in art and it is intended that all of such modifications be included within the scope of the appended claims.

What is claimed:

1. A fishing lure comprising a non-decorated bait-shaped body;

a resilient cloth covering for snugly enclosing said bait body;

said cloth covering have a shade generally conforming to all the surfaces of said bait body but sufficiently smaller than said bait body to resiliently expand said cloth covering when applied over said bait body;

said cloth covering having a limited length slit formed therein to permit said bait body to be inserted into, or removed from, said cloth covering by resilient expansion of said cloth covering:

the external surface of said cloth covering being decorated in a fish attracting covering;

said bait body having opposed side walls, a top wall and a bottom wall, and said cloth covering comprises a single sheet of resilient cloth cut along its edges to define two side panels foldable about a center panel to define side wall portions, top wall portions and bottom wall portions generally shaped to snugly cover said side walls, top wall and bottom walls of said bait body; and means for securing only a limited length of one of said bottom wall portions and said top wall portions together, thereby defining said slit permitting insertion and removal of said bait body relative to said resilient cloth covering.

* * * * *